United States Patent
Kramer et al.

(10) Patent No.: US 11,270,024 B2
(45) Date of Patent: Mar. 8, 2022

(54) SECURE DATA MONITORING UTILIZING SECURE PRIVATE SET INTERSECTION

(71) Applicant: INTERNATIONAL BUSINESS MACHINES CORPORATION, Armonk, NY (US)

(72) Inventors: Dennis Kramer, Siler City, NC (US); Jeb R. Linton, Manassas, VA (US); Michael Amisano, East Northport, NY (US); David K. Wright, Monroe, MI (US); John Melchionne, Kingston, NY (US); John Behnken, Hurley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 16/510,136

(22) Filed: Jul. 12, 2019

(65) Prior Publication Data
US 2020/0175205 A1 Jun. 4, 2020

Related U.S. Application Data

(63) Continuation of application No. 16/203,830, filed on Nov. 29, 2018.

(51) Int. Cl.
*G06F 7/04* (2006.01)
*G06F 17/30* (2006.01)
(Continued)

(52) U.S. Cl.
CPC ...... *G06F 21/6254* (2013.01); *G06F 16/9536* (2019.01); *G06F 21/602* (2013.01); *G06N 20/00* (2019.01)

(58) Field of Classification Search
CPC ............... G06F 21/6254; G06F 21/602; G06F 16/9536; G06N 20/00; G06N 3/08; G06N 3/0445
See application file for complete search history.

(56) References Cited

U.S. PATENT DOCUMENTS 6,999,876 B2    2/2006    Lambert et al.
8,629,776 B2    1/2014    Buck et al.
(Continued)

OTHER PUBLICATIONS

Hook, "V. Real-World Examples, Handy Tips and Sample Screenshots", National Business Institute, Oct. 28, 2016, 130 pages.
(Continued)

*Primary Examiner* — Amie C. Lin
(74) *Attorney, Agent, or Firm* — Scott Dobson; Andrew D. Wright; Roberts Calderon Safran & Cole, P.C.

(57) ABSTRACT

Methods for secure data monitoring utilizing secure private set intersections are disclosed. In embodiments, a computer-implemented method includes: generating a garbled circuit program compiled into a first and second half; sending the second half of the garbled circuit program to a client server of a client; receiving social network data from a social network provider; and generating search results, utilizing the first half of the garbled circuit program in cooperation with the second half of the garbled circuit program, based on client data input at the second half of the garbled circuit program. The client data is private with respect to the social network provider and the social network data is private with respect to the client.

20 Claims, 6 Drawing Sheets

(51) Int. Cl.
*H04N 7/16* (2011.01)
*G06F 21/62* (2013.01)
*G06N 20/00* (2019.01)
*G06F 21/60* (2013.01)
*G06F 16/9536* (2019.01)

(56) References Cited

U.S. PATENT DOCUMENTS

| | | | |
|---|---|---|---|
| 9,589,448 | B1 | 3/2017 | Schneider et al. |
| 10,229,442 | B1 | 3/2019 | Moolla |
| 10,691,754 | B1* | 6/2020 | El Defrawy ........ H04L 63/0428 |
| 2010/0057623 | A1 | 3/2010 | Kapur et al. |
| 2011/0211692 | A1* | 9/2011 | Raykova ............... H04L 9/3218 380/46 |
| 2012/0076302 | A1* | 3/2012 | Kolesnikov ........... H04L 9/3249 380/259 |
| 2015/0039630 | A1* | 2/2015 | Thomee ............. G06F 16/5838 707/748 |
| 2015/0052074 | A1 | 2/2015 | Reynolds |
| 2015/0327061 | A1 | 11/2015 | Haddad et al. |
| 2016/0335476 | A1 | 11/2016 | Renkis |
| 2018/0196812 | A1* | 7/2018 | Gupta ................... G06F 40/284 |
| 2018/0268283 | A1* | 9/2018 | Gilad-Bachrach ...... G06F 17/11 |
| 2018/0367558 | A1 | 12/2018 | Kawakita |
| 2019/0042932 | A1* | 2/2019 | Bhat ..................... G06F 16/951 |
| 2019/0318043 | A1* | 10/2019 | Leka ................... H04L 63/0428 |
| 2019/0340492 | A1 | 11/2019 | Burger et al. |
| 2021/0141839 | A1* | 5/2021 | Tang ................... G06F 16/9535 |

OTHER PUBLICATIONS

Boulos et al., "Social Web mining and exploitation for serious applications: Technosocial Predictive Analytics and related technologies for public health, environmental and national security surveillance", Elsevier, Computer Methods and Programs in Biomedicine 100 (2010), pp. 16-23, Feb. 12, 2010, 8 pages.

Mell et al., "The NIST Definition of Cloud Computing", NIST, Special Publication 800-145, Sep. 2011, 7 pages.

List of IBM Patents or Patent Applications Treated as Related, Jul. 10, 2019, 1 page.

Office Action dated Feb. 19, 2021 in related U.S. Appl. No. 16/203,830, 26 pages.

Final Office Action dated Aug. 30, 2021 in related U.S. Appl. No. 16/203,830, 32 pages.

* cited by examiner

SECURE DATA MONITORING UTILIZING SECURE PRIVATE SET INTERSECTION

BACKGROUND

The present invention relates generally to data monitoring and, more particularly, to secure data monitoring utilizing secure private set intersection.

Safety personnel may have multiple sources of data available to them, but do not necessarily have the resources, time or computing skills required to analyze the data for actionable concerns. Tools that exist today to support safety personnel require back end information technology (IT) personnel to provide technical support, and budgets (e.g., local level budges) may not be able to support such personnel. Moreover, IT personnel are generally not the best personnel to act on safety concerns, and there is a need to provide pertinent safety information directly to safety personnel trained to act on such information.

Safety products or solutions that do not preserve the privacy of the client using the product have the potential to expose "areas of focus" of the client to others. Therefore, a mechanism is needed that will obfuscate topics being searched or monitored by safety personnel from those who have no need for the information. Ideally, such a mechanism would obfuscate all parameters of interest to a client, including for example, time, intent, geographical location, actors involved, sensitive physical locations (e.g., properties to be protected), etc.

SUMMARY

In a first aspect of the invention, there is a computer-implemented method including: generating, by a computing device, a garbled circuit program compiled into a first half and a second half; sending, by the computing device, the second half of the garbled circuit program to a client server of a client; receiving, by the computing device, social network data from a social network provider; and generating search results, by the computing device utilizing the first half of the garbled circuit program in cooperation with the second half of the garbled circuit program at the client server, based on client data input at the second half of the garbled circuit program. Advantageously, the client data is private with respect to the social network provider and the social network data is private with respect to the client. According, the privacy of the client is preserved while also maintaining the privacy of the social network users.

In implementations, the method further includes: generating an alert, by the computing device utilizing the first half of the garbled circuit program in cooperation with the second half of the garbled circuit program at the client server, wherein the alert is based on the search results; and issuing, by the computing device, the alert to the client server. Thus, embodiments of the invention enable the generation and distribution of alerts to clients (e.g., safety personnel), without the need for the client to have particular information technology (IT) training or knowledge.

Another method of the invention includes: receiving, by a client computing device of a client, a first half of a garbled circuit program from a provider server, wherein the second half of the garbled circuit program is located at the provider server; inputting, by the client computing device, client data into the first half of the garbled circuit program, wherein the client data defines search criteria for a search of social network data received at the provider server from a social network provider; and generating search results, by the client computing device utilizing the first half of the garbled circuit program in cooperation with the second half of the garbled circuit program at the provider server, based on the client data. Advantageously, the client data is private with respect to the social network provider and the social network data is private with respect to the client. Thus, embodiments of the invention enable search results to be generated without the need for storage of sensitive information (e.g., social network data) at the client site.

In embodiments, the method further comprises: generating an alert, by the client computing device utilizing the first half of the garbled circuit program in cooperation with the second half of the garbled circuit program at the provider server, wherein the alert is based on the search results; and issuing, by the client computing device, the alert to the client, wherein the alert is private from the provider server. Thus, embodiments of the invention further ensure the privacy of the client by keeping the alert private from the provider server.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
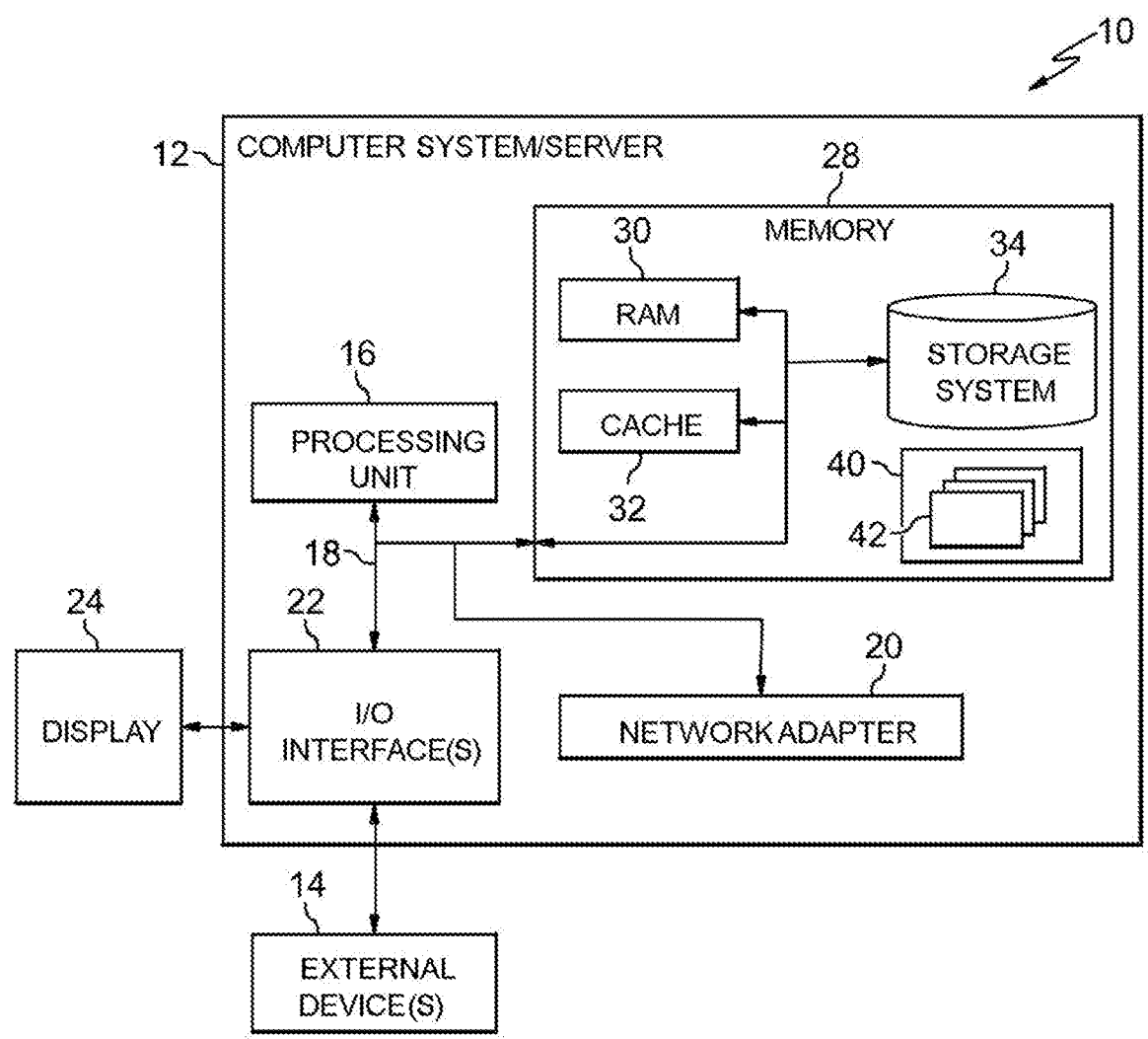
FIG. 1 depicts a cloud computing node according to an embodiment of the present invention.

The present invention relates generally to data monitoring and, more particularly, to secure data monitoring utilizing secure private set intersection. In embodiments, systems, computer program products, and methods of the invention enable automated monitoring of social network data for actionable alerts utilizing a garbled circuit. In aspects, a first half of a garbled circuit at a client server receives client data from a client (e.g., safety organization or emergency organization), a second half of the garbled circuit receives social network data from a social network provider, and the first and second halves of the garbled circuit cooperatively index the social network data and generate search results or alerts based on intent (derived by a neural network of the garbled circuit) and the client data.

Advantageously, embodiments of the invention provide systems and methods whereby alerts based on intent derived from social network data are provided to a client (e.g., safety organization), but input from safety personnel into the system is kept private from others (e.g., the social network provider), the social media data is kept private from the client, and there is no storage of sensitive information (e.g., social network data) at the client site. In aspects, by providing a client with an executable half of a garbled circuit, the need for the client to provide technical expertise is eliminated, thus enabling clients with limited resources (e.g., small town safety personnel), to receive actionable alerts based on neural network derived intent. Moreover, cloud-based embodiments of the invention relieve clients from dependencies on local technology personnel.

Embodiments of the invention provide a technical solution to the technical problem of securely monitoring potentially sensitive data by generating a cryptographic protocol in the form of a garbled circuit to cooperatively perform indexing, searching, and alerting functions. Advantageously, embodiments of the invention constitute improvements in the technical field of data monitoring by isolating potentially sensitive data from other participants in the monitoring system. Specifically, implementations of the invention isolate social network data from safety organizations, while isolating client data from the provider of the social network data. Aspects of the invention further isolate client data from the service provider (provider of the garbled circuit).

Embodiments of the invention link secure databases to incorporate the following: artificial intelligence tools for determining intent of consumers of monitored social network feeds; inherent masking of search criteria (client data) to protect the client (e.g., safety personnel) and others (e.g., person of interest to be protected); and alerts based on alerting thresholds for both intent and sources of social media content. For example, intent content (e.g., a tip) derived from a safety officer may carry more weight than intent content from an unknown actor. In such cases, the client may be provided with the ability to approve or reject a source of intent content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
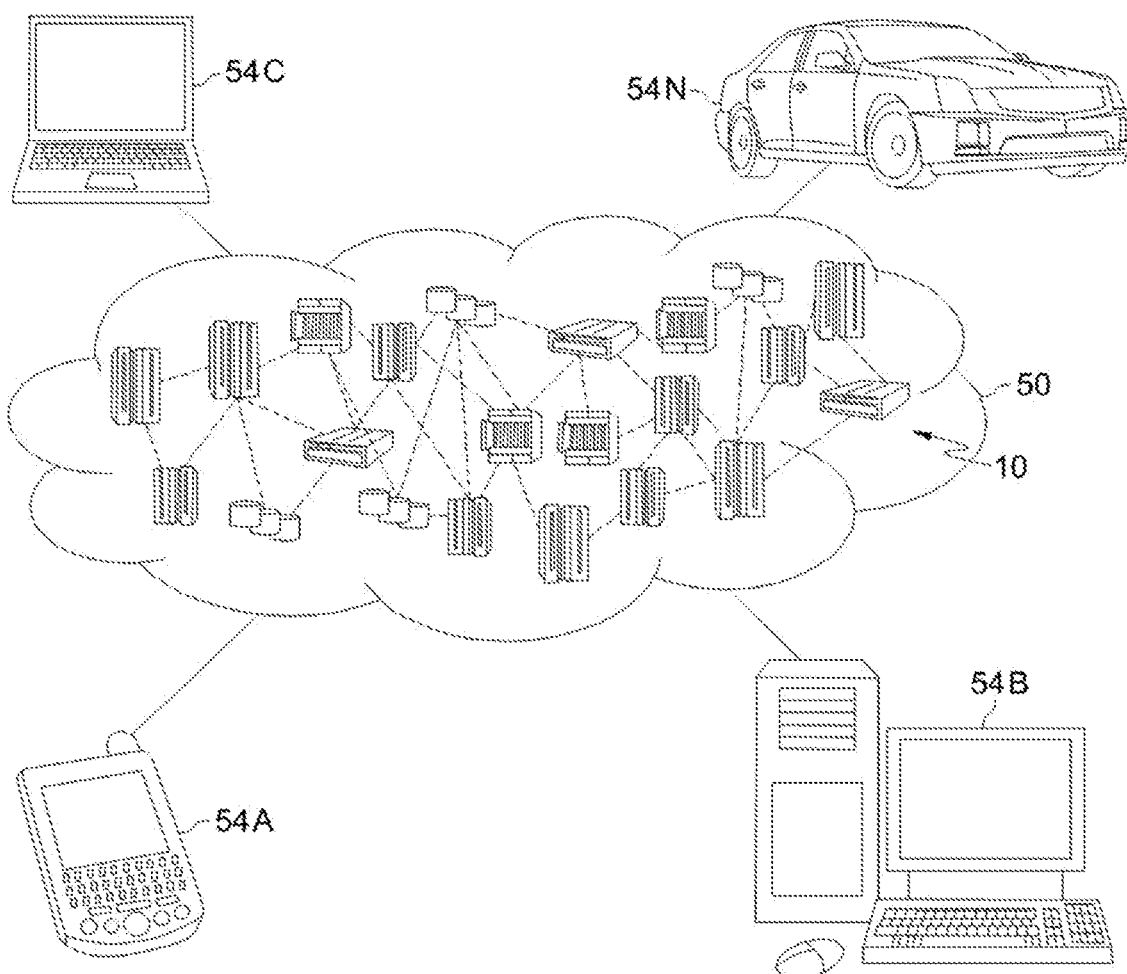
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
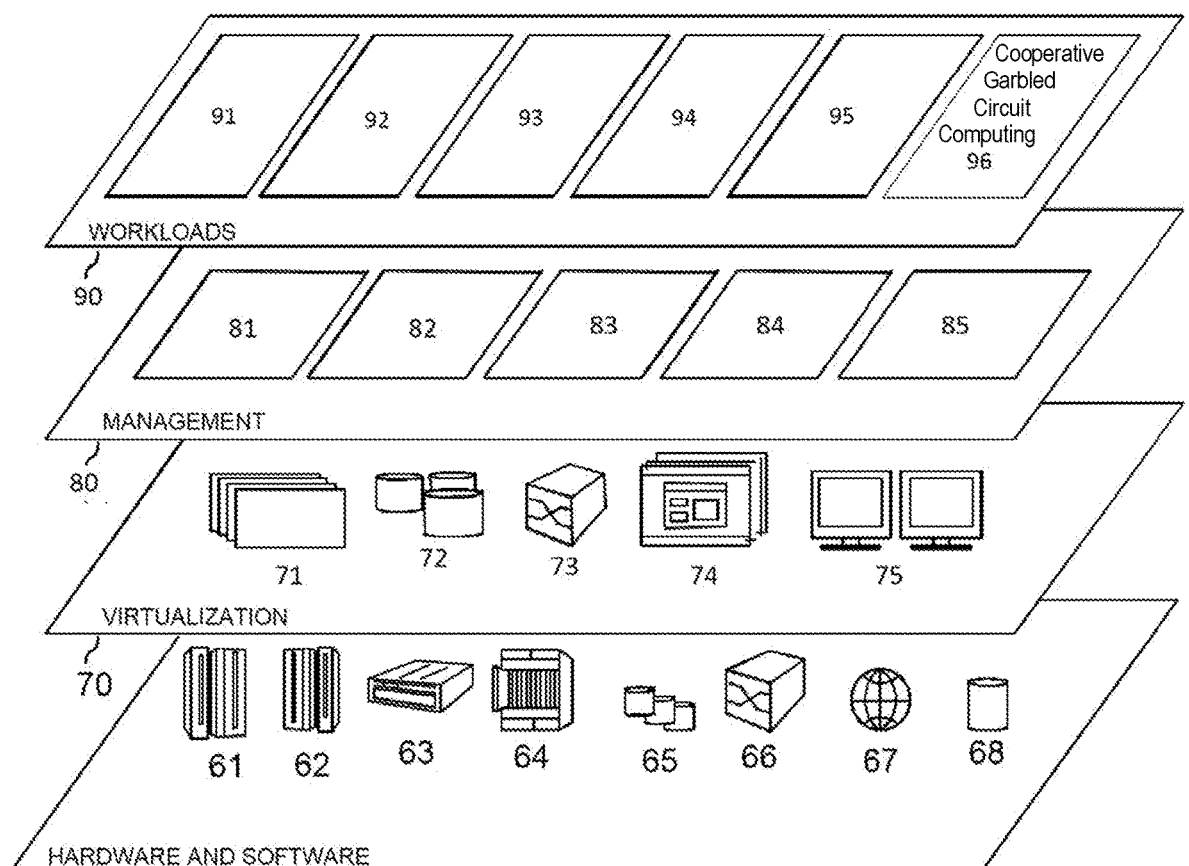
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cooperative garbled circuit computing 96.

Implementations of the invention may include a computer system/server 12 of FIG. 1 in which one or more of the program modules 42 are configured to perform (or cause the computer system/server 12 to perform) one or more functions of the cooperative garbled circuit computing 96 of FIG. 3. For example, the one or more of the program modules 42 may be configured to: cooperatively index social network data, search indexed data based on client data inputs to the garbled circuit, generate and distribute search results, and generate and distribute alerts based on the search results.

Figure 4:
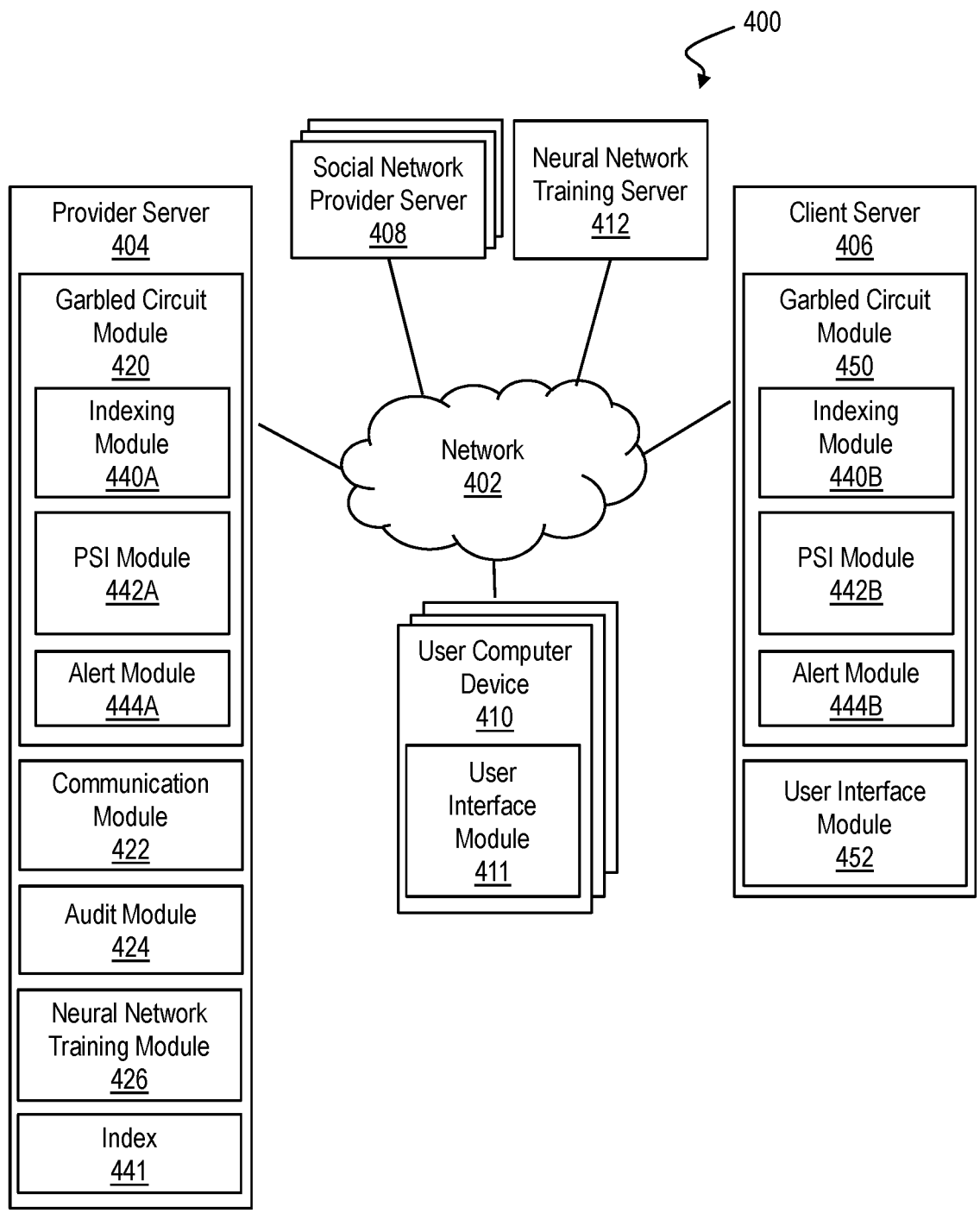
FIG. 4 shows a block diagram of an exemplary environment in accordance with aspects of the invention.

FIG. 4 shows a block diagram of an exemplary secure monitoring environment 400 in accordance with aspects of the invention. In embodiments, the secure monitoring environment 400 includes a network 402 enabling communication between a provider server 404 (e.g., cloud server), one or more client servers 406, and one or more social network provider servers 408. In embodiments, the secure monitoring environment 400 includes one or more user computer devices 410. In aspects, the secure monitoring environment 400 includes a neural network training server 412. In implementations, the secure monitoring environment 400 is performed in the cloud computing environment 50 of FIG. 2, wherein the one or more cloud computing nodes 10 include one or more of the provider server 404, client server(s) 406, social network provider server(s) 408, user computer device(s) 410 and neural network training server 412.

The network 402 may be any suitable communication network or combination of networks, such as a local area network (LAN), a general wide area network (WAN), and/or a public network (e.g., the Internet). In embodiments, the provider server 404 is in the form of the computer system/server 12. In embodiments, the provider server 404 is a specialized computing device configured to cooperatively and securely generate (compute) search results with one or more of the client servers 406, utilizing a garbled circuit program of the present invention. The client servers 406 may include components of the computer system/server 12, and may be, for example, a desktop computer or laptop computer. In implementations, the provider server is a cloud-based server providing services to a plurality of client servers 406. In embodiments, the provider server 404 is configured to communicate with multiple client servers 406 simultaneously, and perform monitoring functions separately for each client server 406 independent of the others.

In embodiments, the user computer devices 410 each include one or more of the components of the computer system/server 12, and may be a desktop computer, laptop computer, tablet computer, smartphone, vehicle computer or other user computer device. In the example of FIG. 4, the one or more user computer devices 410 are shown with a user interface module 411 configured to enable users to input and receive data (e.g., alerts from the provider server 404). Similarly, in embodiments of the invention, the social network provider servers 408 each include one or more of the components of the computer system/server 12, and may be specialized computer servers configured to provide social network functions to the one or more user computer devices 410.

In implementations, the neural network training server 412 includes one or more of the components of the computer system/server 12, and may be a special purpose computing device configured to train a machine learning model for indexing of data based on context (e.g., intent). In aspects, the neural network training server 412 utilizes natural language processes using deep neural nets to develop language models. In aspects, these language models utilize long short term memory modules (LSTMs) for training within the secure monitoring environment 400. Such training of the models may be resource intensive. Accordingly, in embodiments, the training of the models is performed by the neural network training server 412 separate from the provider server 404 and client server 406, in the cloud environment of FIG. 4.

Still referring to FIG. 4, the provider server 404 includes one or more program modules (e.g., program module 42 of FIG. 1) executed by the provider server 404 and configured to perform one or more of the functions described herein. In embodiments, the provider server 404 includes a garbled circuit module 420 configured to generate a garbled circuit program, compile the garbled circuit into a first half and a second half, provide the second half of the garbled circuit program to a client server (e.g., client server 406), and execute the first half of the garbled circuit, wherein the first and second half of the garbled circuit program are configured to cooperatively perform data monitoring steps over the network 402. In aspects, the provider server 404 includes one or more of: a communication module 422 configured to enable an exchange of data with other entities of the secure monitoring environment 400, an audit module 424 configured to enable the secure collection and storage of data (e.g., search result data and associated evidence), and a neural network training module 426 configured to train a machine learning model.

In implementations, the provider server 404 includes, as part of the first half of the garbled circuit generated by the garbled circuit module 420, one or more of: an indexing module 440A configured to index social networking data received by the provider server 404 and save the indexed data in an index 441; a private set intersection (PSI) module 442A configured to perform a search of the Index 441 and provide search results to one or more participants in the secure monitoring environment 400; and an alert module 444A configured to generate and distribute alerts based on the search results.

Still referring to FIG. 4, in embodiments, the client server 406 includes one or more program modules (e.g., program module 42 of FIG. 1) executed by the client server 406 and configured to perform one or more of the functions described herein. In embodiments, the client server 406 includes a garbled circuit module 450 configured to receive and execute the second half of the garbled circuit generated by the provider server 404. In aspects, the client server 406 includes a user interface module 452 configured to enable a client to communicate search criteria, preferences, configuration information, and other data to the provider server 404 over the network 402.

In implementations, the client server 406 includes, as part of the second half of the garbled circuit generated by the garbled circuit module 420, one or more of: an indexing module 440B configured to index social networking data received by the provider server 404 in cooperation with the indexing module 440A of the provider server 404; a private set intersection (PSI) module 442B configured to perform a search of the Index 441 and provide search results to one or more participants in the secure monitoring environment 400 in cooperation with the PSI module 442A of the provider server 404; and an alert module 444B configured to generate and distribute alerts based on the search results, and in cooperation with the alert module 444A of the provider server 404.

The quantity of devices and/or networks in the secure monitoring environment 400 is not limited to what is shown in FIG. 4. In practice, the secure monitoring environment 400 may include additional devices and/or networks; fewer devices and/or networks; different devices and/or networks; or differently arranged devices and/or networks than illustrated in FIG. 4. Also, in some implementations, one or more of the devices of the secure monitoring environment 400 may perform one or more functions described as being performed by another one or more of the devices of secure monitoring environment 400. For example, functions of the neural network training server 412 may be conducted by the client server 406 in embodiments of the invention. Devices of the secure monitoring environment 400 may interconnect via wired connections, wireless connections, or a combination of wired and wireless connections.

Figure 5:
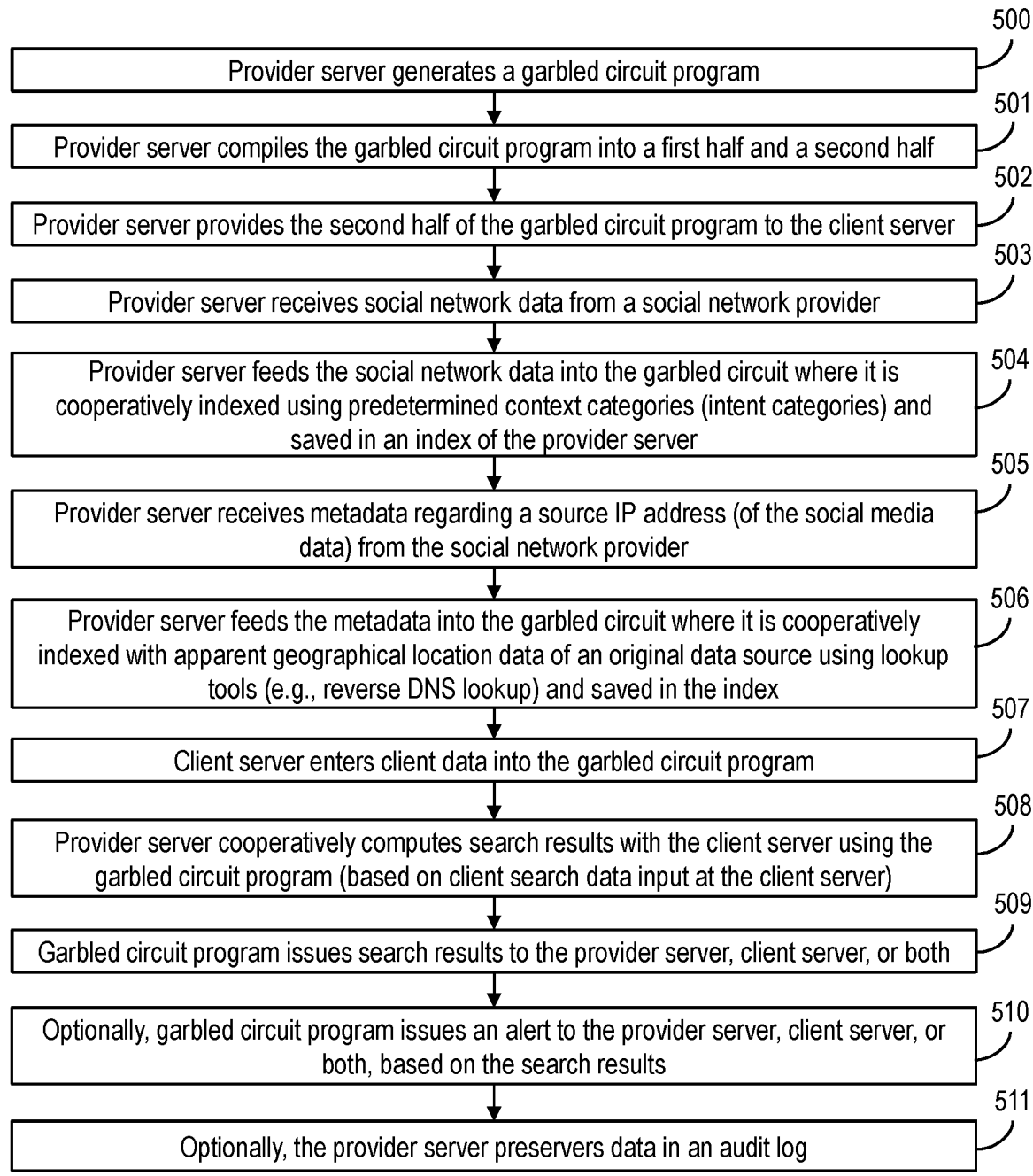
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the provider server 404 generates a garbled circuit program. The term garbled circuit as used herein refers to a cryptographic protocol that enables two-party secure computation in which two parties can jointly evaluate a function over their private inputs without the presence of a trusted third party. In embodiments, the garbled circuit module 420 of the provider server 404 generates the garbled circuit program according to step 500. In implementations, the garbled circuit program includes a machine learning model for use in indexing functions of the garbled circuit program. In embodiments, the neural network training module 426 of the provider server 404 trains the machine learning model. In alternative embodiments, a remote neural network training server 412 trains the machine learning model. In implementations, the neural network training module 426 or the neural network training server 412, use natural language processes using deep neural nets to develop the machine learning model. In embodiments, the neural network training module 426 or the neural network training server 412, utilize long short term memory (LSTM) units to train the machine learning model within the secure monitoring environment 400. LSTMs are units of a recurrent neural network (RNN), and are capable of learning long-term dependencies.

In implementations, the training of the machine learning models is performed at the neural network training server 412, and thus conservers resources of the provider server 404 by eliminating the need to perform resource intensive training of the machine learning model at the provider server 404. In aspects, the machine learning model includes weights and biases generated during training of the machine learning model. Once trained, the machine learning model is incorporated into the garbled circuit program. In embodiments, once trained, the machine learning model does relatively little actual computation, and therefore can operate at sufficient speed and volume, even in the form of a relatively inefficient garbled circuit construct of embodiments of the invention. In aspects, the machine learning model utilized by the indexing modules 440A, 440B are trained to identify categories of malicious intent. In embodiments, the machine learning model of the garbled circuit is customized based on input from a client (e.g., a safety organization). In alternative embodiments, the machine learning model is a default model generated, for example, based on input from a service provider (e.g., manager of the provider server 404). For example, the machine learning model may be trained to recognize particular types of malicious intent based a specific request from a law enforcement agency, or may be trained to recognize general categories of malicious intent.

At step 501, the provider server 404 compiles the garbled circuit program generated at step 500 into a first half and a second half. In embodiments, the garbled circuit module 420 of the provider server 404 compiles the first half and the second half of the garbled circuit program according to step 501. In implementations, the first and second half of the garbled circuit program each include a respective indexing module (440A, 440B), a PSI module (442A, 442B) and an alert module (444A, 444B), as depicted in FIG. 4.

At step 502, the provider server 404 provides the second half of the garbled circuit program to the client server 406. In embodiments, the client server 406 is managed by a safety organization tasked with performing public or private safety functions. In one example, the client server 406 is managed by a local law enforcement agency. In implementations of the invention, the client server 406 receives the second half of the garbled circuit program in the form of the garbled circuit module 450 of FIG. 4, which is configured to be executed by the client server 406.

At step 503, the provider server 404 receives social network data from one or more social network provider servers 408. In embodiments, the social network data is in the form of at least one of text-based data, image data, audio data, and video data. In implementations, the social network data is text-based data derived from content postings in a social media network. In embodiments, the social network data is in the form of social media traffic, as defined by a provider of the provider server 404. The provider server 404 may receive social network data continuously or periodically.

At step 504, the provider server 404 feeds the social network data into the garbled circuit (e.g., represented by the garbled circuit modules 420 and 450), where it is cooperatively indexed using predetermined context categories (e.g., intent categories). In embodiments, the provider server 404 feeds social network data into the indexing module 440A of the provider server 404 for indexing, wherein the social network data is utilized by indexing modules 440A and 440B to cooperatively generated indexing data, which is saved in the index 441. In aspects, indexing of the social network data is performed utilizing a customized machine learning model or default machine learning model. In aspects, the indexing modules 440A and 440B utilize machine learning tools, including one or more of natural language processing (NLP) tools, speech-to-text tools, image recognition tools, and combinations thereof, to identify predetermined context categories, such as categories of intent.

At step 505, the provider server 404 receives metadata regarding a source IP address of the social network data received at step 503. In aspects, the communication module 422 receives the metadata with the social network data at step 503.

At step 506, the provider server 404 feeds the metadata received at step 505 to the garbled circuit, where it is cooperatively indexed with apparent geographical location data of an original data source. In embodiments, the garbled circuit (e.g., indexing modules 440A, 440B) utilize lookup tools, such as a reverse domain name system (DNS) lookup tool, to determine an apparent geographical location associated with each source IP address of an original data source (e.g., source of the social media content received at step 503), and saves the indexed metadata in the index 441 with the geographical location data. In implementations, as the social network data is crawled and fed into the provider server 404, the intent detection machine learning inference is performed by the indexing modules 440A, 440B, and metadata is stored in the index 441 regarding the intents detected. In embodiments, when a large amount of data is involved, the provider server 404 utilizes an oblivious random access medium (ORAM) to store the incoming social network data and metadata, while preserving the privacy of operations on the ORAM.

At step 507, the client server 406 enters client data into the garbled circuit program. In aspects, the client data is fed directly into the PSI module 442B of the client server 406, wherein the data is specific to the client utilizing the tools including, for example, a jurisdictional definition, high value target identification (e.g., person to be protected), safety personnel contact information, etc. In embodiments, a client (e.g., safety personnel) enters client data regarding parameters of a search in a user interface module 452 of the client server 406. For example, client data may include intent parameters (e.g., types of malicious intent of interest to the client), and targets of interest, such as a particular building or geographic location. In aspects, a client may enter data into a user interface provided by the provider server 404. For example, the provider server 404 may provide the client with a uniform resource location (URL) to access a web page configured to receive client input. In aspects, the URL supports authentication and authorization requirements for the public sector (e.g., two factor, PIV cards, etc.). In aspects, such authentication prohibits the service provider (provider of provider server 404) from accessing the client data, even with elevated privileges.

At step 508, the provider server 404 cooperatively generates (computes) search results with the client server 406, using the garbled circuit program (represented in FIG. 4 by the garbled circuit modules 420 and 450). In embodiments, the garbled circuit program performs the search (e.g., parses social network text for intent using a neural network) based on the client data entered at step 507. In aspects, the PSI modules 442A and 442B of the respective provider server 404 and client server 406 generate search results in accordance with step 508, wherein the search results constitute new information generated by the garbled circuit program. In implementations, the PSI modules 442A and 442B utilize a PSI protocol, wherein a client (client server 406) and a server (provider server 404) jointly compute an intersection of their private input sets (e.g., social network data and client data, respectively) in a manner that, at the end, the client learns the intersection and the server learns nothing (one-way PSI), or both learn the intersection (mutual PSI). In embodiments, the PSI modules 442A and 442B utilize private intent detection (PID) tools and filters. In aspects, the PSI modules 442A and 442B determine matches between client data received at step 507 and indexed data from the index 441 of the provider server 404, within a certain threshold value or confidence value. Advantageously, embodiments of the invention enable anonymous, collaborative computation (i.e., Yao Construction-style garbled circuits/secure multi-party computation) to permit use of cloud resources while maintaining privacy.

Still referring to step 508, in implementations, traffic pattern tools are utilized by the garbled circuit program to identify communication patterns of interest between social network users, based on intent logic and confidence indicators. For example, identification of repetitive media access control (MAC) addresses or traffic patterns using the same common point (e.g., for example, when communication ceases and a new encrypted tunnel appears with the same common hub) may indicate malicious intent when combined with other indicators in the social network data.

At step 509, the garbled circuit program optionally issues search results based on the computation of search results at step 508. In embodiments, the garbled circuit program issues search results to the provider server 404, client server 406, or both the provider server 404 and the client server 406. In implementations, the garbled circuit program issues search results to a user computer device 410, such as when client data received at step 507 indicates that a particular user computer device 410 is to be provided with search results. In embodiments, the garbled circuit program is represented by the garbled circuit modules 420 and 450, and issuance of the search results is implemented by one or both of the garbled circuit modules 420 and 450. For example, in embodiments where only the client server 406 receives search results, the garbled circuit module 450 (i.e., the second half of the garbled circuit) issues the search results to the client server 406 (e.g., by presenting them to a user through the user interface module 452).

At step 510, the garbled circuit program optionally issues an alert based on the search results computed at step 508. In implementations, the garbled circuit program issues an alert to the provider server 404, the client server 406, a user computer device 410, the social network provider server 408, or combinations thereof. In embodiments, the garbled circuit program is represented by the garbled circuit modules 420 and 450, and issuance of the alert is implemented by one or both of the garbled circuit modules 420 and 450. In aspects, the alert is sent to the client server 406 only, and is private with respect to the social network provider and/or the cloud service provider. In embodiments, steps 509 and 510 are combined. In implementations, the client server 406 is provided with a user input for selecting alert and/or search result reporting preferences. In one example, a web site provided to the client by the provider server 404 enables the client to select automated alerts and/or messages to be dispatched to one or more client personnel (e.g., safety personnel, emergency responders, etc.), such as through short message service (SMS) messages.

In embodiments, search results and/or alerts are generated based on the search results meeting a predetermined threshold. In aspects, the predetermined threshold is based on both intent derived from social network data and a source of the content associated with the intent. For example, content determined to meet a threshold value for mal-intent may be determined to be more or less important based on the source of the content. In aspects, social network data is indexed with geotagging metadata indicating a location associated with a content provider. In aspects, the threshold may be determined based on the geotagging metadata, wherein different locations (e.g., sources of social media content) may have higher or lower values/weights assigned thereto for filtering purposes.

At step 511, the provider server 404 optionally stores data in an audit log, based on the search results of step 508. In one example, an audit module 424 automatically saves search result data and any associated data (e.g., evidence) in an audit log when the garbled circuit program generates search results meeting one or more predetermined threshold criteria. In implementations, the audit module 424 utilizes chain of evidence/chain of custody procedures with respect to search results data as needed to meet applicable laws/rules related to the preservation of legal evidence. In embodiments, the audit module 424 stores evidence data in a secure database, such as with a one-way hash to provide proof of any evidence tampering.

While FIG. 5 is discussed with respect to social network data received from a single network provider, it should be understood that the provider server 404 may receive multiple social network data feeds from a plurality of social network provider servers 408 at the same time, for analysis by the garbled circuit of the present invention. Thus, multiple sources of social network data may be analyzed simultaneously for mal-intent on a continuous or periodic basis in accordance with embodiments of the invention. Moreover, embodiments of the invention protects client data defining safety targets (e.g., persons of interest to be protected, etc.) from monitoring by others. In aspects, services provided by the provider server 404 are conducted on the cloud, whereby cloud deployment of services provides malicious intent detection, geotag mapping, and automated evidence collection including integrity controls.

Figure 6:
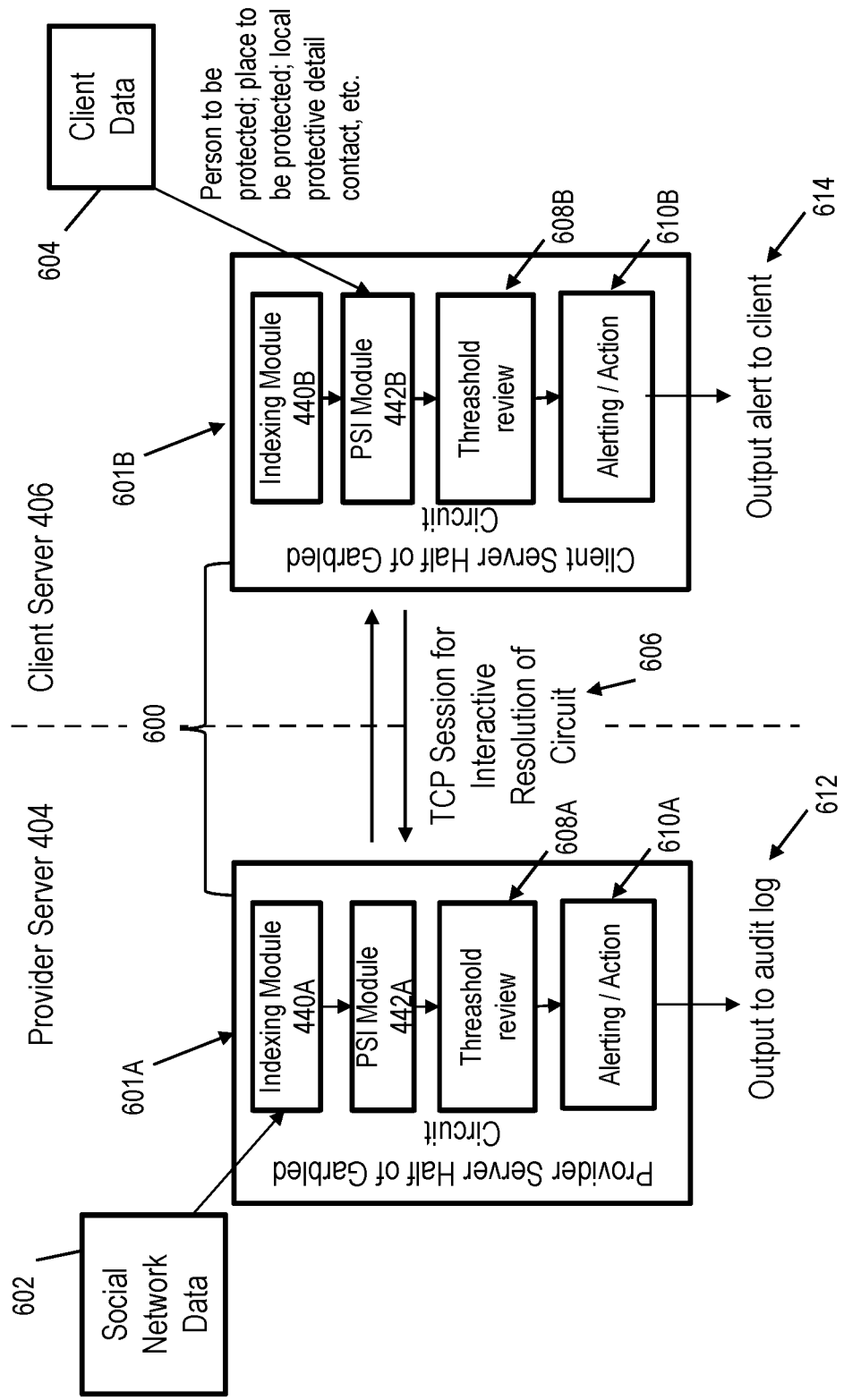
FIG. 6 shows a diagram of a garbled circuit utilized in accordance with embodiments of the invention.

FIG. 6 shows a diagram of a garbled circuit utilized in accordance with embodiments of the invention. The garbled circuit of FIG. 6 may be utilized in the secure monitoring environment 400 of FIG. 4, according to steps set forth in FIG. 5.

As depicted in FIG. 6, a garbled circuit program (hereafter garbled circuit) 600 includes a first half 601A located on the provider server 404, and a second half 601B located on the client server 406. In a first exemplary use scenario, the provider server 404 trains a customized machine learning model based on a request received from a client (owner of the client server 406), and incorporates the customized machine learning model into the garbled circuit 600. In use, the provider server 404 receives social network data 602 in the form of text-based data, and feeds the social network data 602 (including metadata) to the indexing module 440A of the first half 601A of the garbled circuit 600. In accordance with steps 504 and 506 of FIG. 5, the garbled circuit 600 cooperatively indexes the social network data and associated metadata utilizing the customized machine learning model. In the example shown, transmission control protocol (TCP) indicated at 606 is utilized for interactive resolution of the garbled circuit 600.

In accordance with the scenario of FIG. 6, the client server 406 receives client data 604, and feeds the client data 604 to the PSI module 442B of the second half 601B of the garbled circuit 600. In the example of FIG. 6, the client data 604 includes data regarding a person of interest to be protected, a place to be protected (e.g., an address of a building), and contact information and instructions for a local protective detail assigned to protect the person of interest. In accordance with step 508 of FIG. 5, the garbled circuit 600 cooperatively computes search results based on the client data 604 and the data indexed by the indexing modules 440A, 440B. In the example shown, threshold review of the search results is performed by the garbled circuit 600 at 608A, 608B to determine final search results/alerts to present to the client (via client server 406), wherein the threshold parameters are associated with both intent of content providers (i.e., providers of social network content) and a source of the content. At 610A, 610B, the garbled circuit 600 determines an action to take based on search results meeting a predetermined threshold as depicted at 608A, 608B. In aspects, threshold parameters may be selected in whole or in part by the client, such as through a user interface provided by the provider server 404.

In the scenario of FIG. 6, the first half 601A of the garbled circuit 600 outputs data to an audit log at 612 based on the determined search results, and the second half 601B of the garbled circuit 600 outputs an alert (including the search results) to the client at 614 based on the determined search results. In the example of FIG. 6, the alert is issued based on client data 604 indicating a protective detail to be contacted in case of a potentially dangerous situation being detected, wherein the person to be protected indicated in the client data 604 is determined to be at risk based on mal-intent data derived from the social network data 602. In one example, the alert is issued as a SMS message to a user computer device 410 (e.g., smartphone) of an emergency responder. In the scenario of FIG. 6, monitoring of the social network data 602 is performed on a continuous basis for a predetermined period of time. Thus, the example of FIG. 6 provides active monitoring of social network data (e.g., social media) for actionable law enforcement alerting using automation and secure provide set intersection (PSI) with private intent detection. Moreover, the example of FIG. 6 provides actionable alerts to safety personnel without the need for the safety personnel to have any particular technological expertise.

It should be understood that, to the extent implementations of the invention collect, store, or employ personal information provided by, or obtained from, individuals (for example, social media data), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider (e.g., a provider of the provider server 404) could offer to perform the processes described herein. In this case, the service provider can create, maintain, deploy, support, etc., the computer infrastructure that performs the process steps of the invention for one or more customers. These customers may be, for example, safety or emergency response personnel. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In one example, a computer-implemented method for monitoring social media for actionable safety personnel alerting, includes: receiving, at a first half of a garbled circuit, agency input from a safety agency; receiving, at a second half of the garbled circuit, social network text from a social network provider; parsing, within the garbled circuit, the social network text for intent using a neural network; and generating alerts for the safety agency based on the intent and the agency input, wherein the agency input is private from the social network provider and the social network text is private from the safety agency using the garbled circuit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a computing device, a garbled circuit program compiled into a first half and a second half;
sending, by the computing device, the second half of the garbled circuit program to a client server of a client;
receiving, by the computing device, social network data from a social network provider, wherein the social network data is indexed with geotagging metadata; and
generating search results, by the computing device utilizing the first half of the garbled circuit program in cooperation with the second half of the garbled circuit program at the client server, based on client data input at the second half of the garbled circuit program, wherein the client data is private with respect to the social network provider and the social network data is private with respect to the client, wherein the first half and the second half of the garbled circuit program utilize a machine learning model for indexing functions, and the machine learning model is trained to recognize particular types of malicious intent based on a specific request.

2. The computer-implemented method of claim 1, further comprising indexing, by the computing device utilizing the first half of the garbled circuit program in cooperation with the second half of the garbled circuit program at the client server, the social network data based on predetermined context categories, wherein the first half and the second half of the garbled circuit program utilize the machine learning model to index the social network data based on intent derived from the social network data.

3. The computer-implemented method of claim 2, wherein the intent is derived by a neural network of the garbled circuit program.

4. The computer-implemented method of claim 1, further comprising:
generating an alert, by the computing device utilizing the first half of the garbled circuit program in cooperation with the second half of the garbled circuit program at the client server, wherein the alert is based on the search results; and
issuing, by the computing device, the alert to the client server.

5. The computer-implemented method of claim 1, further comprising saving, by the computing device, data associated with the search results in an encrypted audit log.

6. The computer-implemented method of claim 1, further comprising determining, by the computing device utilizing the first half of the garbled circuit program in cooperation with the second half of the garbled circuit program at the client server, a source of content of the social network data.

7. The computer-implemented method of claim 1, wherein the geotagging metadata includes a location associated with a source of content of the social network data.

8. The computer-implemented method of claim 7, wherein different locations included in the geotagging metadata have different weights.

9. The computer-implemented method of claim 8, further comprising generating an alert, by the computing device utilizing the first half of the garbled circuit program in cooperation with the second half of the garbled circuit program at the client server, based on the search results.

10. The computer-implemented method of claim 9, wherein the alert is generated based on the search results meeting a predetermined threshold.

11. The computer-implemented method of claim 10, wherein the predetermined threshold is based on both intent derived from the social network data and the source of the content of the social network data.

12. The computer-implemented method of claim 11, wherein the social network data includes multiple social network data feeds from a plurality of social network providers.

13. The computer-implemented method of claim 12, wherein:
the first half and the second half of the garbled circuit program utilize the machine learning model to index the social network data based on intent derived from the social network data, and
the machine learning model is trained utilizing long short term memory units (LSTMs).

14. The computer-implemented method of claim 13, wherein the LSTMs are units of a recurrent neural network.

15. The computer-implemented method of claim 13, wherein the LSTMs are configured to learn long-term dependencies.

16. A computer-implemented method, comprising:
receiving, by a client computing device of a client, a first half of a garbled circuit program from a provider server, wherein a second half of the garbled circuit program is located at the provider server;

inputting, by the client computing device, client data into the first half of the garbled circuit program, wherein the client data defines search criteria for a search of social network data received at the provider server from a social network provider; and generating search results, by the client computing device utilizing the first half of the garbled circuit program in cooperation with the second half of the garbled circuit program at the provider server, based on the search results meeting a predetermined threshold, wherein the client data is private with respect to the social network provider and the social network data is private with respect to the client, wherein the first half and the second half of the garbled circuit program utilize a machine learning model for indexing functions, and the machine learning model is trained to recognize particular types of malicious intent based on a specific request.

17. The computer-implemented method of claim 16, further comprising indexing, by the client computing device utilizing the first half of the garbled circuit program in cooperation with the second half of the garbled circuit program at the provider server, the social network data based on predetermined context categories, wherein the first half and the second half of the garbled circuit program utilize the machine learning model to index the social network data based on intent derived from the social network data.

18. The computer-implemented method of claim 16, further comprising:
    generating an alert, by the client computing device utilizing the first half of the garbled circuit program in cooperation with the second half of the garbled circuit program at the provider server, wherein the alert is based on the search results; and
    issuing, by the client computing device, the alert to the client, wherein the alert is private from the provider server.

19. The computer-implemented method of claim 18, further comprising receiving, by the client computing device, client preferences regarding the alert, wherein the issuing of the alert is performed based on the client preferences.

20. The computer-implemented method of claim 16, further comprising determining, by the client computing device utilizing the first half of the garbled circuit program in cooperation with the second half of the garbled circuit program at the provider server, a source of content of the social network data.

* * * * *